No. 662,811. Patented Nov. 27, 1900.
J. A. PEER & W. E. PROTZMAN.
NUT LOCK.
(Application filed Jan. 8, 1900.)
(No Model.)
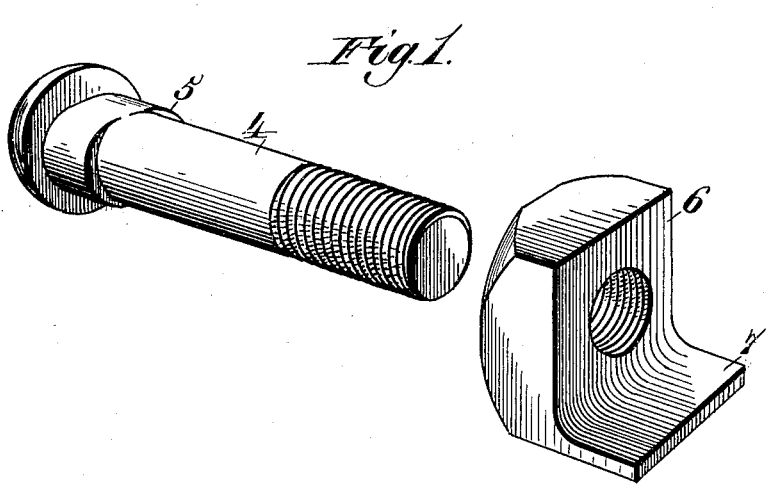
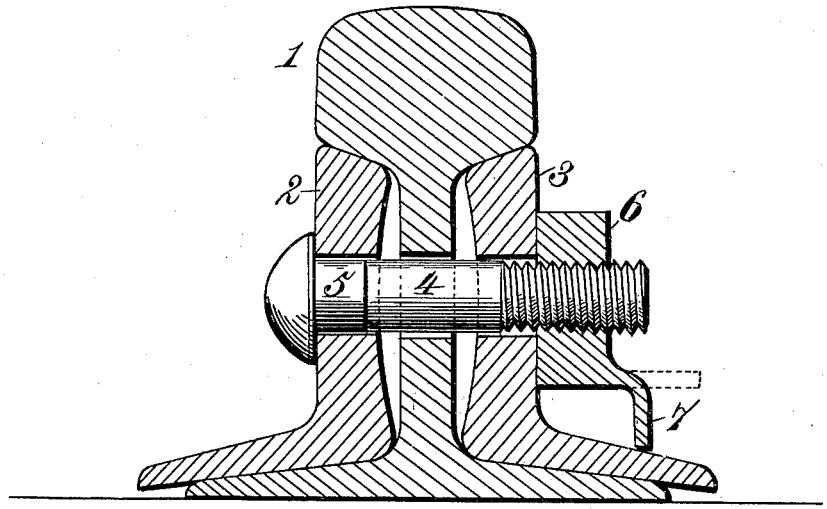

UNITED STATES PATENT OFFICE.

JOHN A. PEER AND WILLIAM E. PROTZMAN, OF BLOOMINGTON, ILLINOIS.

NUT-LOCK.

SPECIFICATION forming part of Letters Patent No. 662,811, dated November 27, 1900.

Application filed January 8, 1900. Serial No. 754. (No model.)

*To all whom it may concern:*

Be it known that we, JOHN A. PEER and WILLIAM E. PROTZMAN, citizens of the United States, residing at Bloomington, in the county of McLean and State of Illinois, have invented new and useful Improvements in Nut-Locks, of which the following is a specification.

Our invention relates to nut-locks, one object of the same being to provide a simple and cheaply-constructed device of this kind which is especially adapted for securing fish-plates or angle-bar connecting-plates to the webs of two adjacent rails of a railroad.

A further object of the invention is to dispense with all pawls, ratchets, washers, and the like which are now commonly employed in devices of this character and to utilize merely the nut and the bolt with the parts which they are intended to secure for locking the nut in place.

The invention consists of a bolt provided with means for preventing the turning thereof and a nut upon the end of said bolt having a longitudinally-extending wing or projection on one side which is adapted to be folded outwardly and downwardly to engage the upper surface of the angle-bar for preventing the turning of said nut.

It also consists in certain features and details of construction and combinations of parts, which will be hereinafter more fully described and claimed.

In the drawings forming part of this specification, Figure 1 is a perspective view illustrative of a bolt with a nut thereon embodying our improvements; and Fig. 2 is a transverse section through a rail with our improvements applied, the wing on the nut being shown in full lines in its locking position and in dotted lines in the position in which it is originally formed.

Like reference-numerals indicate like parts in the different views.

The rail 1 and the fish-plates or angle-bars 2 3 on opposite sides of the web thereof are all of the usual form and construction. The bolt 4 extends through these parts, as clearly shown in Fig. 2 of the drawings, and is formed with an elliptical enlargement 5 or other suitable irregularity, which fits within a corresponding opening in the angle-bar 2. The opposite threaded end of the bolt 4 projects through a circular opening in the angle-bar or fish-plate 3. Fitting upon the projecting end of the bolt 4 is the nut 6, the same being formed with an integral longitudinally-extending wing or projection 7, adapted to be bent down, as shown in Fig. 2 of the drawings, to engage the upper surface of the angle-bar 3 or the upper surface of the base of the rail 1, in the event that an ordinary fish-plate is employed, for preventing the turning of the nut when it has once been seated. The corner between the body of the nut 6 and the wing or projection 7 is rounded, as shown in Fig. 1, so that when said wing is bent downwardly into locking position the fibers of the material of which the nut is made will not be ruptured and the joint consequently weakened. It is essential that this rounded corner be provided when the wing 7 is to be bent outwardly, and especial importance is placed upon this feature of the invention.

When the parts are applied as shown in Fig. 2 of the drawings, longitudinal movement of the bolt 4 is prevented by the nut 6, rotary movement of said bolt is prevented by the enlargement 5 thereon engaging a correspondingly-shaped opening in an angle-bar 2, and rotary movement of the nut 6 is prevented by the engagement of the wing 7 thereon with the upper surface of the angle-bar 3. It will thus be seen that all of the parts cooperate to produce a simple and effective lock and that when the nut 6 is once in place it is impossible to separate the same from the bolt 4 or to separate the bolt 4 from said nut without first moving the wing 7 out of engagement with the fish-plate 3.

The device is extremely simple in its construction, effective in operation, and can be produced at a cost which will at once recommend itself to railroad and other companies requiring the use of this class of device.

Having now described our invention, what we claim as new, and desire to secure by Letters Patent, is—

The combination with a rail, of a fish-plate mounted at each side of said rail and against the web and base thereof and one of which is provided with an elliptical-shaped opening and the other of said plates provided with an annular opening, a bolt extending through the web of said rail and said openings and formed at one end adjacent to the head thereof with an elliptical enlarged portion which is adapted to be seated within the elliptical-shaped opening of the fish-plate to prevent the turning of the bolt, a nut mounted upon the said bolt and adapted to engage one of the said fish-plates, and a longitudinally-extending rectangular-shaped wing formed integral in a rounded manner with the outer lower corner of said nut and adapted to be bent downwardly to engage the base of one of the said fish-plates to prevent the turning of the nut, substantially as herein shown and described.

In testimony whereof we have hereunto set our hands in presence of two subscribing witnesses.

JOHN A. PEER.
WILLIAM E. PROTZMAN.

Witnesses to signature of John A. Peer:
JAMES L. NORRIS,
F. B. KEEFER.

Witnesses to signature of Wm. E. Protzman:
ROBERT P. HOFFMAN,
REGINALD C. ROGERS.